June 6, 1939.  J. E. PADGETT  2,161,234
UNIVERSAL JOINT
Filed Feb. 17, 1937  2 Sheets-Sheet 1

Inventor
Joseph E. Padgett
By Strauch & Hoffman
Attorneys

June 6, 1939. J. E. PADGETT 2,161,234
UNIVERSAL JOINT
Filed Feb. 17, 1937 2 Sheets-Sheet 2
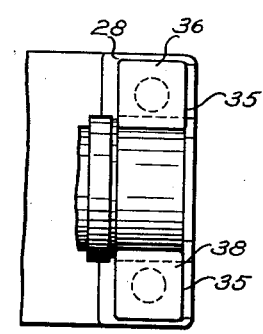
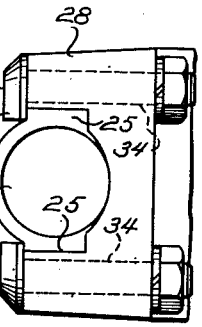
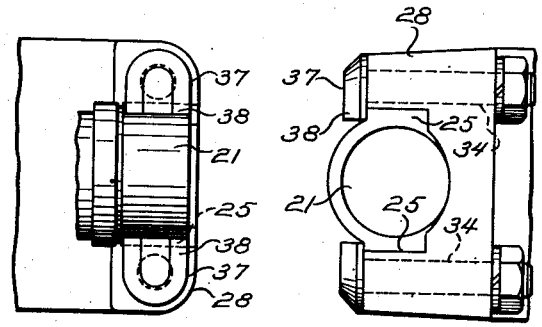
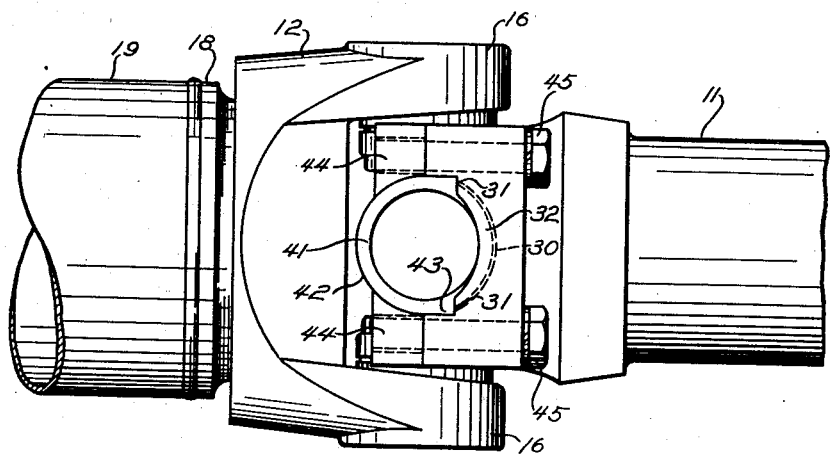
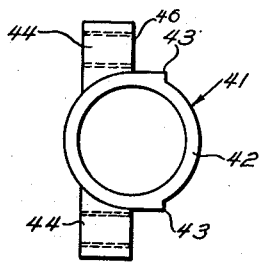
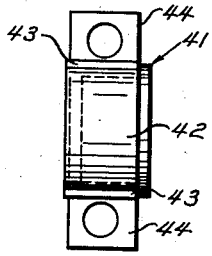
Inventor
Joseph E. Padgett
By Strauch & Hoffman
Attorneys Patented June 6, 1939

2,161,234

UNITED STATES PATENT OFFICE 2,161,234

UNIVERSAL JOINT

Joseph E. Padgett, Toledo, Ohio

Application February 17, 1937, Serial No. 126,268

15 Claims. (Cl. 64—17)

The present invention relates to universal joints, and more particularly to novel constructions thereof increasing the facility of assembly, decreasing the cost of manufacture, and insuring more dependable performance thereof.

In universal joints as embodied in drive couplings for transmitting power from one driven member or shaft to another at an angle therewith, as for instance in automobiles for transmitting power from the transmission to the differential, it is the usual practice to provide a joint or connection formed of a pair of yoke members having spaced arms for receiving the trunnions on a cross element usually termed a spider. The arms of the yoke members are usually formed either with integral aligned apertured portions in which the spider trunnions are journalled, or are formed with flat end surfaces to which bearing units for accommodating the trunnions are detachably secured. In such prior constructions, considerable difficulty has been experienced in assembly of the units, and the several elements thereon must be skillfully manipulated to assemble the joint in a minimum of time. This difficulty is increased when changing or repairing a joint already installed on an automobile wherein the drive shaft is beneath the car and difficult of access. Such prior constructions have also involved expensive machining operations which have increased the cost of the joint.

In an endeavor to overcome these disadvantages, a joint or coupling has been provided composed of at least one yoke member with arms having semi-cylindrical end surfaces formed to provide aligned recesses or pockets within which bearing elements are detachably secured by means such as U-bolts, and further formed with flanges for retaining the bearing elements in proper radial position on the spider with respect to the center of the joint, this type of joint being disclosed in a copending application of J. W. B. Pearce, Serial No. 43,266, filed October 2, 1935. In such a joint, a tendency has been exhibited for the trunnion bearing element to roll out of the half-hole or recess formed in the yoke arm, and an undesirable amount of strain has been imposed on the U-bolt. Furthermore, the clamping action of the U-bolt tends in some cases to deform the cylindrical portion of the bearing element constituting the race which may result in cramping and failure of the bearing. This prior type of construction is expensive because the type of operation to produce the necessary accuracy is one that is difficult to perform and to control.

In overcoming the aforesaid disadvantages of the prior art, it is a major object of my invention to provide a joint of novel construction which construction facilitates assembly and dismantling of the joint, since a yoke or the yokes may be inserted or withdrawn in an endwise direction with respect to the cross member or spider, thereby eliminating intricate assembly methods and permitting assembly of a yoke or the yokes on the spider without disturbing the bearing units which may be previously assembled on the spider trunnions.

A further object of my invention resides in the provision of a universal joint of novel construction wherein accurate positioning of the bearing units of the joint is insured at reduced cost by reason of the construction entailing a simpler and more easily controlled machining operation than prior constructions.

Still a further object of my invention is to provide a universal joint of novel construction with a yoke designed for endwise movement in assembly and having half-holes or recesses in the arms thereof, wherein relatively wide supporting surfaces are provided to sustain the load imposed on the joint, and any tendency for the bearing bushings or races to roll out of the half-holes or recesses is eliminated.

A further object of my invention resides in the provision of a universal joint of novel construction including yokes formed with recesses to receive the bearing elements in endwise movement wherein novel securing means is provided which has no tendency to deform the bearing elements and cause failure of the bearing.

Still a further object of my invention is to provide a universal joint of novel construction which can be assembled in relatively easy manner and is relatively inexpensive to manufacture as compared with prior joints.

Further objects of the invention will appear from the following description when considered together with the accompanying drawings in which like reference characters are employed to denote like parts throughout the several views.

In the drawings:

Figure 3 is an elevation of a portion of the joint of Figure 2 illustrating the means for securing the bearing bushing or race to the yoke.

Figure 4 is a plan of a portion of the joint shown in Figure 2 with a modified form of fastening means.

Figure 5 is a view similar to Figure 3 of the modified form of fastening means shown in Figure 4.

Figure 6 is a view partly in section and partly in elevation showing a further preferred embodiment of the present invention.

Figure 7 is a plan view of the bearing block employed in the joint of Figure 6.

Figure 8 is a side elevation of the bearing block of Figure 7.

Figure 1:
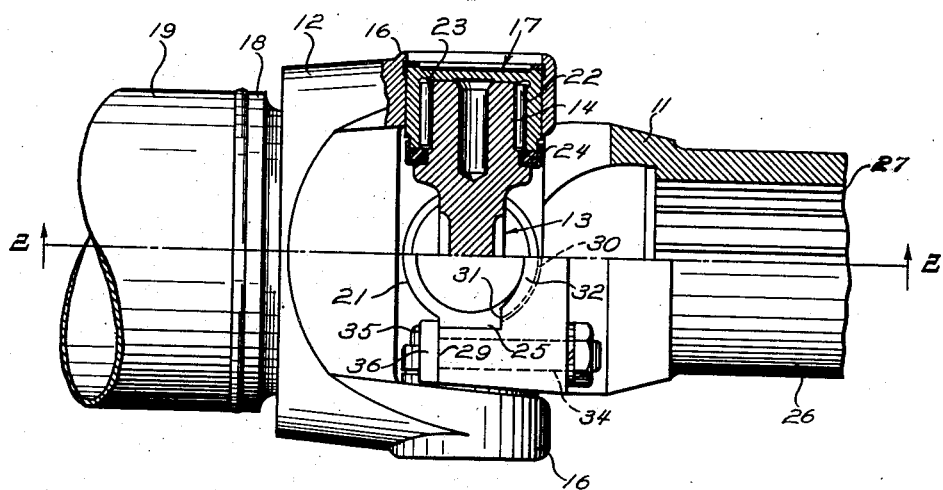
Figure 1 is a view partly in section and partly in elevation showing a preferred embodiment of the present invention.

Referring to the drawings, a universal joint embodying the present invention comprises a yoke 11, a yoke 12, and a spider or cross 13 having a pair of trunnions 14 upon which yoke 12 is mounted, and a second pair of trunnions 15 upon which yoke 11 is mounted when the parts are assembled.

Yoke 12 is of a form well known in the art and includes a pair of spaced arms formed at their free ends with aligned ring portions 16 apertured to accommodate bearing units indicated generally at 17 within which trunnions 14 are journalled. The yoke arms are formed upon a sleeve portion 18 telescoped within and secured for rotation with a suitable shaft, as for example, a tubular propeller shaft 19 of an automotive vehicle.

Mounted upon the end of each trunnion 15 is a bearing unit 21 similar in internal construction to bearing units 17 on trunnion 14. Briefly, each unit 21 includes a generally cup-shaped bearing race 22, provided with needle bearings 23 within which the trunnion is journalled, and a ring gasket assembly 24 seated upon a shoulder formed at the base of the trunnion to prevent leakage of lubricant out of the bearing race cup 22 along the trunnion surface. As before stated, the bearing units on trunnions 14 and 15 are of similar internal construction. However, the bearing bushings or cups on the trunnions 14 and 15 which cups serve as external races for the needle bearings 23, are of different construction. The cups for the trunnions 14 are preferably circular in cross-section to be fitted within the apertures in ring sections 16. The cups 21 for the trunnions 15 are of different shape in cross-section since they are formed with accurately machined and axially extending flanges or lugs 25 on opposite sides of the bushings, preferably extending the full length of the bushings, which lugs serve as locating surfaces and aid in securing the cups to the yoke in a manner to be presently described.

Each yoke 11 includes a sleeve portion 26 provided with internal splines 27, a taper, or other fitting designed for suitable engagement with a mating fitting formed on the end of a suitable driving or driven shaft (not shown). Provision is made for axial movement of yoke 11 relative to the driving or driven shaft when the axes of the yoke and shaft assume an angular position relative to one another during rotation of the joint.

Extending away from sleeve 26 in opposite directions are two arms 28, which terminate as indicated at 29, in substantially spaced relation with respect to each other. The terminus 29 of each arm 28 is provided with a laterally aligned recess or half-hole 30, generally semi-cylindrical in shape, the recesses 30 in the two arms being alinged along an axis substantially normal to the axis of sleeve 26. At each side of each recess 30 an accurately machined stop shoulder 31 is formed to receive a face of a lug 25 on bushing 21. It will be noted that the bushing or race 21 does not contact the entire surface of the recesses 30. Only the lugs 25 of the bearing race and the shoulders 31 of the recess are in contact. This arrangement not only provides a more accurate placement of the bushing with respect to the yoke by reason of the contact at only two points, but also eliminates the need for accurately machining the entire surface of the recesses 30 which may be formed in any convenient shape, thus eliminating an item of major expense in the manufacture of the joint.

Extending partially around the periphery of each recess 30 is a preferably crescent-shaped abutment flange or shoulder 32 which defines the outer limit of the recess and holds bearing race 21 in fixed position with relation to the trunnion of the spider. As viewed in Figure 1, flange 32 is of a maximum width adjacent the bottom of pocket 30, and tapers away to a minimum width adjacent the top of the pocket.

The inner surface of flange 32 is preferably chamfered as at 33 to facilitate assembly of the joint. Chamfer 33 is of importance in the present invention in that it facilitates the insertion of the spider between the opposing shoulders 32. When it is considered that there is practically no clearance between the ends of races 21 and shoulders 32, it is apparent that it would be very difficult to maintain the engaging surfaces exactly parallel while the parts were being assembled, especially if the flat surfaces extended for any depth. Chamfer 33, as shown, allows the corner of one race to be placed in the corner of the yoke where the surfaces 30 and 32 meet and the other race to be readily rocked into position. Thus the chamfer solves a difficult problem in the assembly of the unit.

Each arm 28 adjacent its end 29 at each side of pocket 30 is provided with a bore 34 as shown in Figure 1. Said bores preferably extend parallel to the axis of sleeve 26 and are designed to receive suitable bolts 35 presently to be described in detail. As viewed in Figure 1, when yoke 11 is assembled with respect to cross 13, the aligned shoulders 31 and the yoke surfaces adjacent lugs 25 receive the bearing cups 21 mounted on trunnions 15, and shoulders 31 and 32 with the side surfaces of lugs 25 function to properly position the cup with respect to the assembly.

As shown in Figure 1, bolts 35 comprise a head portion 36 which is of a size to engage the adjacent faces of lugs 25 on bearing bushings or races 21. Thus when each bushing 21 is assembled in a recess 30 so that portions of the lugs thereon engage shoulders 31 of the recess, the side surfaces of the lugs engage the side surfaces of the recess, the outer end of the bushing engages the inner side of the shoulder 32, and the bolts 35 are drawn tight, the bearing bushings are drawn into a fixed and predetermined position with respect to the trunnions on the spider of the joint.

Figure 2:
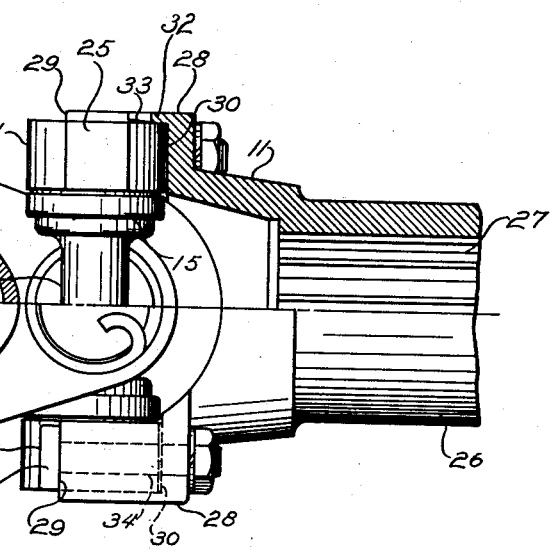
Figure 2 is a view partly in section and partly in elevation taken substantially along the line 2—2 of Figure 1.

In Figures 1, 2 and 3 I have shown a bolt 35 having a head 36 of symmetrical design which may engage the corresponding external lug face of the bushing 21 in any of four positions. Referring to Figures 4 and 5, I have there shown a second preferred form of bolt which has a head 37 thereon having a lug 38 extending substantially the full length of the bushing 21. Obviously, the shape of the bolt head may be varied as desired except that it is desired to make the portion contacting the bearing cup lugs of a length substantially coextensive with the bearing cup.

In the above identified constructions, it will be noted that there is a wide flat surface of considerable extent extending beyond the center of the bearing bushing to sustain the load imposed thereon, and the bushing has no tendency to roll out of the half-hole or recess in the yoke. It will also be noted that the clamping action is effective through a straight solid section under compression and there is no force acting to cause deformation of the cylindrical bearing surface. The absence of any deformation of the race is highly important in a bearing, as deformation, even to a slight degree will often result in failure of the bearing, particularly where bearings of the needle type are employed.

Referring to the further preferred embodiment of my invention shown in Figure 6, it will be noted that the recess or half-hole 30 is not formed quite as deep as recess 30 of Figure 1. Shoulders 31 are employed in the modification shown in Figure 6 in substantially the same manner as in the modification shown in Figure 1 and designed so that a clearance is formed adjacent the surface of the recess as shown in dotted lines. In this embodiment of the invention, the bearing bushing shown at 41 is of different construction than that shown at 21 in Figure 1. As viewed in Figures 7 and 8, the bearing bushing comprises a portion 42 of generally cylindrical shape having shoulders 43 thereon that they may be designed to engage the shoulders 31 of pocket 30. In addition, the bearing bushing is formed with oppositely extending wings or lugs 44, which are apertured and preferably threaded to receive bolts 45. Surfaces 46 are provided on lugs 44 to engage the end surfaces of the yoke and position the bushing axially of the assembly. The bushing is preferably proportioned so that shoulders 31 and surfaces 46 are practically tight when the unit is assembled, any clearance being at the shoulders 31. Otherwise, if the assembly bears first at shoulders 31, the lugs 44 must be bent slightly before the bolts are tight.

In assembling this joint, the spider 13 is first assembled in yoke 12. Yoke 11 is then brought into engagement with the bushings 41, the shoulders 43 thereof preferably engaging the shoulders 31 of recesses 30, and the surfaces 46 engaging the end surfaces of the yoke, the latter engagement being preferably first. As pointed out above, a clearance may be provided between shoulders 31 and 43. Bolts 45 are then threaded into the lugs 44 and the assembly drawn tight. In this construction, as in that shown in Figure 1, recess 30 need only be roughly machined so as to provide a clearance between the adjacent portion of the bushing and the surface of the recess. This as before stated, obviates the necessity of accurately machining the entire surface of the recess 30 to fit it to the bearing bushing and effects a savings in the cost of manufacture.

It will be noted in the construction shown in Figure 6 there is no overhanging load imposed on the bearing bushing and the bushing is brought into complete and secure engagement with the recess 30 of yoke 11. By reason of flange 32, which is the same as that in Figure 1, and the shoulders 31 and 43, accurate positioning of the bushing 41 is always insured. The provision of the lugs 44 through which the bearing is secured insures against any deformation of the bearing race with consequent failure of the bearing.

It will be seen from the foregoing description that the present invention provides a universal joint construction which may be readily assembled or dismantled, which insures alignment and proper positioning of the joint bearings and which can be made at a relatively lower cost than previous joints.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A universal joint comprising a yoke member having spaced arms provided at their extremities with laterally open axially aligned bearing recesses, a spider, trunnions on said spider, bearing elements on said trunnions arranged to fit within said recesses oppositely disposed lugs projecting substantially laterally from said bearing elements, and means to engage said lugs to secure said bearing elements in said recesses.

2. A universal joint including a member having an aperture defined by spaced shoulders, a trunnion, a bearing element on said trunnion having lugs with faces arranged to engage said spaced shoulders to position said bearing element with respect to said trunnion, and means to further engage exposed faces of said lugs for securing said bearing elements to said member.

3. A universal joint comprising a yoke including a pair of arms terminating in spaced relation to one another, the spaced extremities of said arms being formed with aligned laterally open recesses, stop shoulders on said arms projecting into said recesses, a spider having a pair of trunnions with bearings mounted thereon, means on said bearings arranged to engage said stop shoulders to position said bearings, and independent means spaced outwardly from each of said stop shoulders and cooperating with said means on said bearings to secure said bearings against said shoulders.

4. A universal joint comprising a member having a laterally open recess therein, a flange overhanging said recess, a trunnion having a bearing thereon, stop shoulders in said recess, said bearing being arranged to be positioned in said recess by said flange, and said stop shoulders, and independent means adjacent said stop shoulders and spaced therefrom to secure said bearing in position.

5. A universal joint comprising a yoke having a laterally aligned recess therein, stop shoulders on opposite sides of said recess, a bearing element arranged to fit within said recess, lugs on said element with faces arranged to engage said stop shoulders and position said element in predetermined relation to said yoke, and means spaced outwardly from said shoulders to engage said lugs and said yoke to secure said element to said yoke.

6. A universal joint comprising a yoke having a laterally aligned recess therein, stop shoulders on opposite sides of said recess, a bearing element arranged to fit within said recess, lugs on said element having faces arranged to engage said stop shoulders and position said element in predetermined relation to said yoke, apertures in said yoke laterally spaced beyond said stop shoulders, and means in said apertures to engage said lugs to secure said element to said yoke.

7. A universal joint comprising a yoke having a laterally aligned recess therein, stop shoulders on opposite sides of said recess, a bearing element arranged to fit within said recess, lugs on said element substantially coextensive therewith and having faces arranged to engage said stop shoulders and position said element in predetermined relation to said yoke and means to engage said lugs substantially along their entire length to secure said element to said yoke.

8. A universal joint comprising a yoke having a laterally aligned recess therein, stop shoulders on opposite sides of said recess, a bearing element arranged to fit within said recess, projecting lugs on said element substantially coextensive therewith and having faces arranged to engage said stop shoulders and position said element in predetermined relation to said yoke, said yoke being provided with apertures adjacent each of said stop shoulders, means in said apertures with surfaces thereon coextensive with said lugs to engage said lugs and secure said element to said yoke.

9. A universal joint comprising a yoke having a laterally aligned recess therein, a bearing arranged to fit within said recess, lugs on said bearing extending in a direction normal to the side walls of said recess, means on the side walls of said recess to contact said lugs to position said bearing laterally of said joint, and means distinct from said positioning means to engage said lugs and yoke to secure said bearing to said yoke.

10. A universal joint comprising a yoke having a laterally aligned recess therein, stop shoulders within said recess and on the opposite sides of said recess, a bearing arranged to fit within said recess, means on said bearing to engage said shoulders to position said bearing laterally of said joint, lugs on said bearing, and means to engage said lugs and yoke to secure said bearing to said yoke.

11. A universal joint comprising a yoke having a laterally aligned recess therein, stop shoulders on opposite sides of said recess, a bearing, shoulders on said bearing arranged to engage said stop shoulders to position said bearing laterally of said universal joint, integral lugs on said bearing substantially coextensive with the length of said bearing, and means engaging said lugs substantially along their entire length to secure said lugs to said yoke.

12. A universal joint comprising a member having laterally aligned recesses therein, a shoulder overhanging said recess, stop shoulders on the opposite sides of said recess, a bearing arranged to fit within said recess and be positioned transversely of said joint by said overhanging shoulder, shoulders on said bearing arranged to engage said stop shoulders to position said bearing laterally of said joint, integral lugs on said bearing substantially coextensive with the length of said bearing, and means engaging said lugs substantially along their entire length to secure said lugs to said yoke.

13. In a universal joint, a yoke having a pair of oppositely extending arms terminating in laterally open recesses, shoulders on opposite sides of said recesses, substantially circular trunnion bearings adapted to be received in said recesses and a pair of substantially axially disposed lugs extending from opposite sides of each of said bearings and having faces adapted to contact said shoulders whereby accurate and speedy positioning of said bearing with respect to said member during assembly is insured.

14. In a universal joint, a yoke having a laterally open recess, oppositely disposed shoulders in said recess, a bearing adapted to be received by said recess, oppositely disposed lugs on said bearing, said lugs having faces adapted to engage said shoulders for positioning said bearing in said recess during assembly and additional external faces separated from said first-named faces, and means engaging said external faces and cooperating with said yoke for securing said bearing in position at said shoulders.

15. In a universal joint, a yoke having an arm terminating in a laterally open recess, a trunnion bearing having projecting lugs, shoulder means in said recess for engaging said lugs for positioning said bearing, a pair of apertured ears rigidly secured to opposite sides of said bearing, and means extending through said apertures for securing said bearing to said arm.

JOSEPH E. PADGETT.